Figure 1:
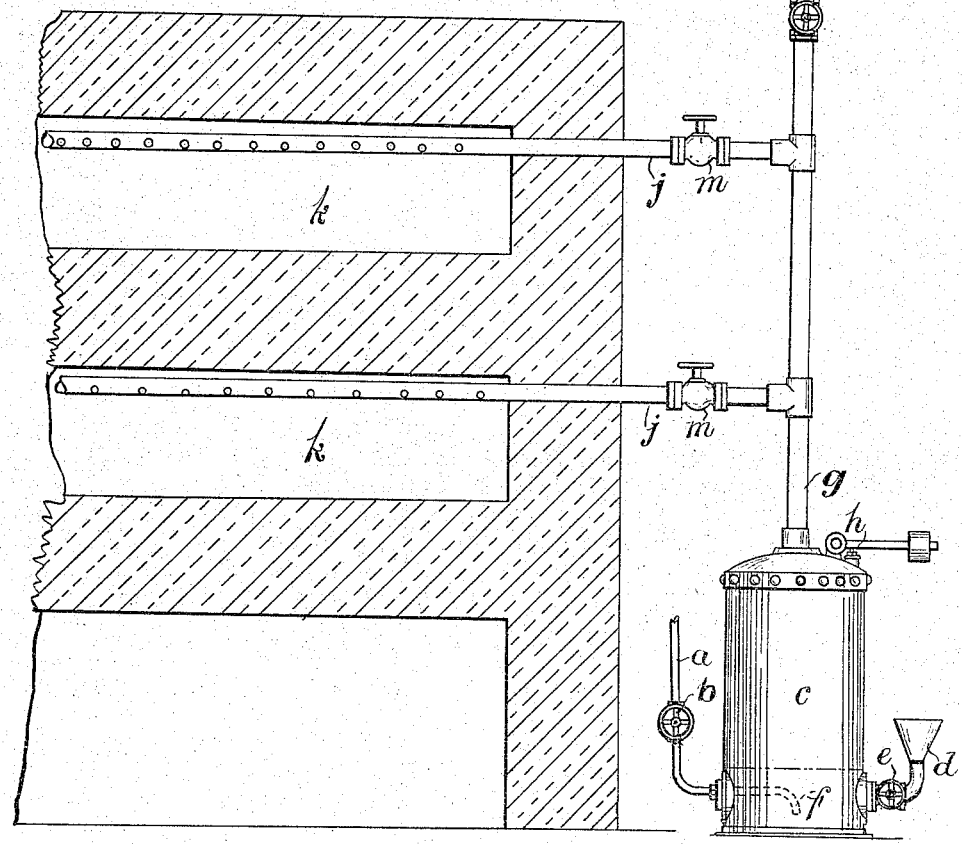

L. EMBREY.
BAKING.
APPLICATION FILED OCT. 5, 1915.

1,169,023.

Patented Jan. 18, 1916.
2 SHEETS—SHEET 1.

L. EMBREY.
BAKING.
APPLICATION FILED OCT. 5, 1915.

1,169,023.

Patented Jan. 18, 1916.
2 SHEETS—SHEET 2.

WITNESSES

INVENTOR
L. Embrey
BY
ATTORNEY

UNITED STATES PATENT OFFICE.

LAURENCE EMBREY, OF FENTON, ENGLAND.

BAKING.

1,169,023.  Specification of Letters Patent.  Patented Jan. 18, 1916.

Application filed October 5, 1915. Serial No. 54,243.

*To all whom it may concern:*

Be it known that I, LAURENCE EMBREY, a subject of the King of Great Britain, residing at Fenton, Staffordshire, England, have invented certain new and useful Improvements in Baking, of which the following is a specification.

This invention relates to the moistening of the heated air within bakers' ovens and to a method of improving the bread, either plain or fancy, baked in these ovens.

The proper development of bread during baking requires the maintenance of the outer skin in an elastic state. If the outer skin becomes hard and brittle at an early stage it will not stretch as the loaf rises. The result is that the outer skin in time peels and does not form what is known as a "good bloom." Loaves usually rise chiefly on one side—the side most remote from the hot walls, and with a dry outer skin this rising is apt to cause malformation of the bread or objectionable bursting of the crust. The hardening of the crust is also apt to stifle the development and lead to the production of inferior bread. If the skin of the loaf is kept properly moist for a fairly protracted period during the early stages of baking the result is that the loaf comes out with a glazed crust. Great difficulty has heretofore been found in getting a glaze on bread and it has been impossible to have the degree of moisture so regulated that the desired effect can be obtained in any oven.

The methods hitherto employed for obtaining a moist atmosphere in bakers' ovens fall under three main categories. (*a*) Those in which steam is generated in a vessel outside the oven chamber, either in a flue of the oven or quite outside the oven and admitted into the oven chamber. (*b*) Those in which water was placed in open or closed vessels within the oven. (*c*) Another method has been to brush or spray the dough with water before entry into the oven. The last method is unsatisfactory as it is impossible to insure uniform moistening of the dough, that is the deposit of a thin uniform film of moisture all over the dough. The second method is not under control as regards the timing of the moistening effect or the degree, so that the baker must to some considerable extent trust to luck or make a compromise. Further, the presence of water in the oven tends to produce local cooling and the character and quality of wetness of the steam is not under control. The first method (*a*) above obviates most of these disadvantages as the supply of steam and the exact moment of its injection may be controlled. I have found, however, that it is impossible to get the right quality and quantity of steam into the oven in this manner. After careful experiment I have discovered that the best results are obtained by producing the moistening vapor indirectly from steam.

According to this invention the bread is placed in the oven chamber, whereupon vapor produced by passing steam through water is injected into the oven chamber.

I attribute the remarkable difference in the action of directly generated steam and indirectly generated water vapor to the presence in the cloud of water vapor of evenly distributed globules of water which rapidly and uniformly permeate every part of the oven and deposit on the dough, owing to its being cooler than the walls of the oven, a thin uniform film of moisture. The globules of water are already deprived to a considerable extent of their latent heat and produce a local skin cooling and moistening effect which delays the formation of a hard crust and facilitates the production of a skin with a high degree of elasticity.

Figure 2:
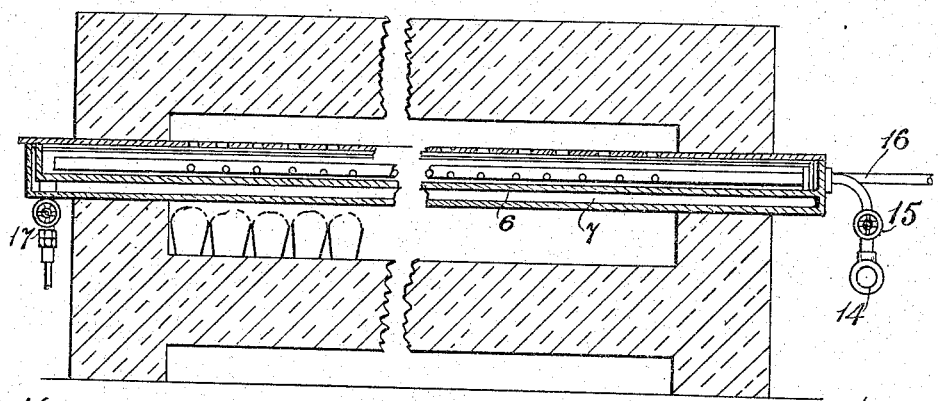
Figure 3:
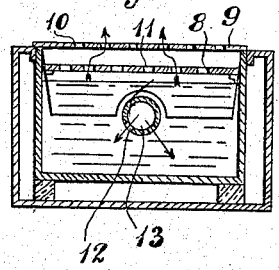
Figure 4:
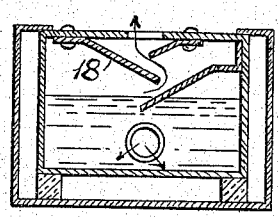
Figure 5:
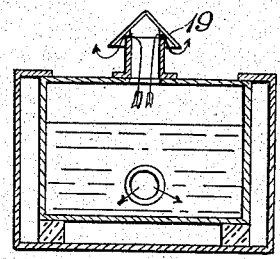

The invention will now be described with reference to the accompanying drawings, in which, Figure 1 is a sectional elevation of a two deck oven with the invention applied using external generation of the vapor cloud. Fig. 2 is a cross section of a single deck oven with internally generated water vapor. Fig. 3 is a cross section of the vapor generator. Figs. 4 and 5 are modified sections of the vapor generator.

In carrying the invention into effect according to the form shown in Fig. 1, live steam conveniently at a pressure of about 40 lbs. is led by a pipe *a* under the control of a valve *b* into a vessel *c*. The vessel *c* contains water supplied through a filler *d*, having a valve *e* in the connection from the filler *d* to the chamber *c*. The steam pipe *a* preferably terminates in a downward bend $f$ which is several inches below the water level. Only a small quantity of water is required in the chamber $c$. The chamber $c$ forms an external collecting chamber for the vapor generated and to be injected into the boiler chamber. From the upper end of the chamber $c$ there leads a vapor discharge pipe $g$ and a safety valve $h$ is conveniently provided to prevent undue rise of pressure in the chamber $c$. From the vapor pipe $g$ branch distributer pipes $j, j$, lead to the oven chambers $k, k$. The branch pipes $j, j$, may be provided with a number of perforations in their length, or slots, to allow the water vapor to pass into the oven chamber. Valves $m, m$, in the pipes $j$ control the supply of vapor to the chamber.

In practice it has been found that a very small steam supply is adequate for practical purposes. The steam pipe $a$ employed in my test was $\frac{1}{4}''$ diameter and the vapor pipes were $1\frac{1}{2}''$ diameter. In baking thin bread the vapor may be supplied to the oven chamber during setting of the bread. For obtaining a highly glazed outer skin the vapor supply is turned on immediately the dough is placed in the chamber, and is maintained for the time found necessary to produce the desired degree of glaze. I have found in an experimental hot air oven that with ten minutes supply of vapor an excellent glaze is obtained. I have also found that with this invention it is possible to use the same oven chambers for baking plain or fancy breads and pastries. This is a matter of very considerable importance which will be thoroughly appreciated by those engaged in this art.

Referring now to Fig. 2 this shows the invention applied to a vapor generator located within the oven chamber. The generator is in the form of an elongated trough or vessel 6, which may if desired have a double wall as shown at 7, with an air space between. This is for the purpose of preventing any cooling effect by the metal surfaces in contact with the water in the generator. The trough is preferably provided as shown in Figs. 3 to 5 with splash plates. The splash plates may as in the case of Fig. 3 consist of two cover plates 8 and 9 having perforations 10 and 11 in staggered relation. Passing through the trough there is a steam supply pipe 13 which may be provided with perforations 12 on its under surface by which steam passes into the water in the trough for the purpose of generating the vapor, this vapor passing then through the perforations 11 and 10 into the oven chamber. The steam is supplied from a main pipe 14 and is controlled by valves 15. The water may be supplied by a pipe 16. A drain 17 may also be provided.

In practice a number of these vapor generators may be arranged at suitable distances apart, so as to facilitate the distribution of the vapor and effect thorough permeation of the whole atmosphere of the oven. Instead of employing the perforated splash plates 8 and 9 the arrangement of splash plates 18 as shown in Fig. 4 may be employed, or a dome 19 as shown in Fig. 5 may be used.

It will be seen that in all cases the heat necessary for supplying the vapor is not taken from the oven chamber and even the cooling effect of the water trough may be eliminated by using the insulating air casing illustrated. The supply of the vapor is under control either through direct control of the cocks or valves $m$ in Fig. 1, or the indirect control of the live steam supply cock 15 in Fig. 2.

Another feature of the invention is that the required quantity of vapor may be obtained very rapidly and may be discontinued when desired. The pressure of the vapor need not exceed 2 to 4 lbs. which is just sufficient to carry the vapor through the distributing pipes into the oven chamber. The boiler steam may not be wholly condensed before it passes into the steam space of the vapor generator, and this steam may constitute part of the humidifying vapor admitted to the oven chamber.

I claim:—

1. The method of baking bread and the like which consists in placing the dough to be baked in an oven, passing steam through water and injecting the vapor so generated into the oven chamber.

2. The method of baking bread and the like which consists in placing the dough to be baked in an oven, passing steam through water and injecting the vapor so generated into the oven chamber during placing of the dough therein.

3. The method of baking bread and the like which consists in placing the dough to be baked in an oven, passing steam through water, collecting the vapor so generated externally of the oven and admitting controlable quantities of said vapor into the oven.

4. The method of baking bread and the like which consists in placing the dough to be baked in an oven, passing pressure steam in a downward direction into a body of water, collecting the vapor so generated under moderate pressure and admitting controlable quantities of said collected vapor into the oven during and for a variable time subsequent to placing of the dough in the oven.

5. In combination with a baker's oven, means for moistening the atmosphere thereof, comprising a vaporizing tank external to the oven, a steam supply pipe thereto, means for controlling said steam supply, means for supplying water to said vaporizer tank, an internal pipe leading from said steam supply and opening downwardly beneath the water level, a vapor discharge pipe from said tank, means in said pipe for controlling the discharge of vapor therethrough and a distributer pipe leading from said vapor discharge pipe and opening within the oven chamber.

In testimony whereof I have signed my name to this specification in the presence of two subscribing witnesses.

LAURENCE EMBREY.

Witnesses:
FRANK MADSLEY,
PERCY HARPER.

Copies of this patent may be obtained for five cents each, by addressing the "Commissioner of Patents, Washington, D. C."